UNITED STATES PATENT OFFICE.

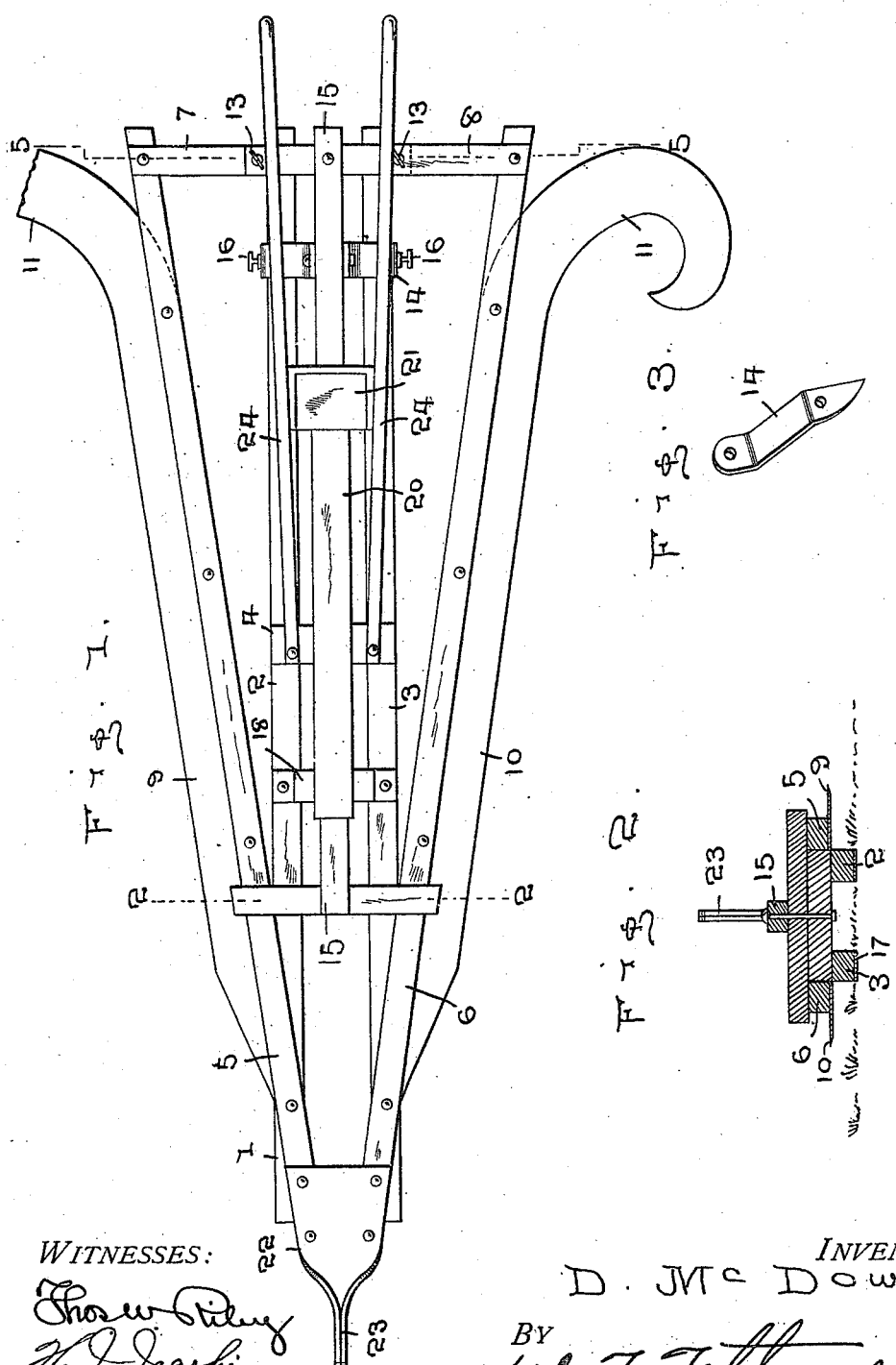

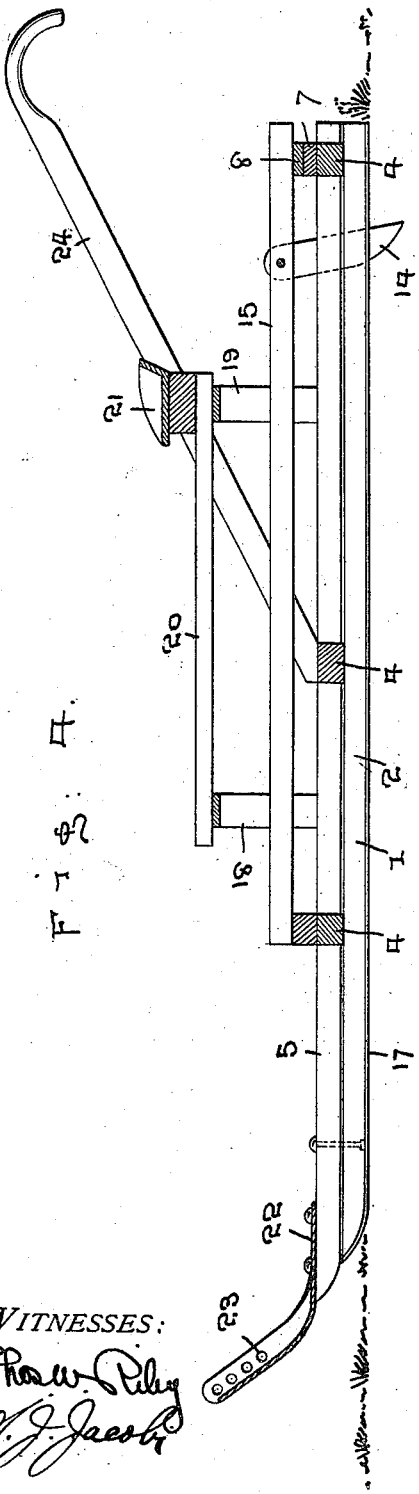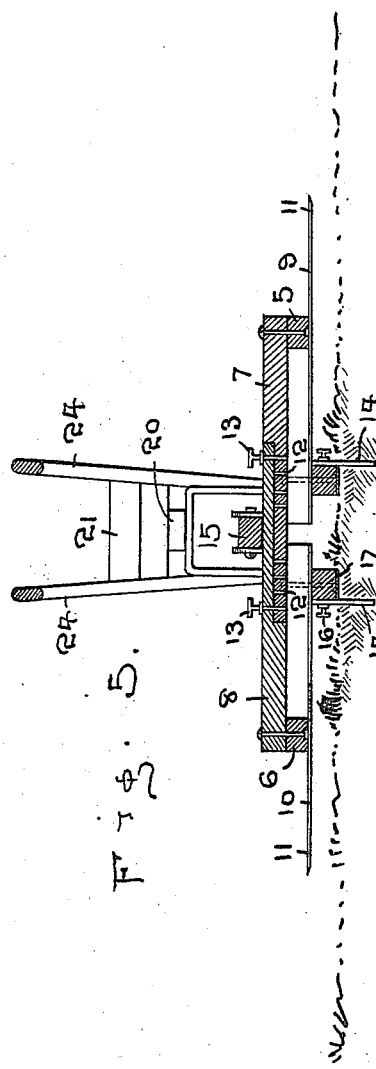

DAUCY McDOWELL, OF TALLULAH, LOUISIANA.

STALK-CUTTER.

987,311.	Specification of Letters Patent.	Patented Mar. 21, 1911.

Application filed August 9, 1910. Serial No. 576,291.

*To all whom it may concern:*

Be it known that I, DAUCY McDOWELL, a citizen of the United States, residing at Tallulah, in the parish of Madison and State of Louisiana, have invented certain new and useful Improvements in Stalk-Cutters; and I do hereby declare the following to be a full, clear, and exact description of the invention, such as will enable others skilled in the art to which it appertains to make and use the same.

My invention relates to new and useful improvements in stalk cutters, and more particularly to cotton stalk cutters, and my object is to provide a device which shall cut two rows at once.

A further object is to provide a cutter having extra wide cutting blades which are completely curved at their rear ends.

A further object is to provide runners for said cutter whereby the same may be drawn from field to field conveniently.

A further object is to provide means for the adjustment of the cutter so as to conform to the width of the space between the rows.

A further object is to provide adjustable colters for the cutter, and

A still further object is to provide means to operate the device manually, or by horse.

Other objects and advantages will be hereinafter referred to, and more particularly pointed out in the specification and claim.

In the accompanying drawings forming a part of this application, Figure 1 is a top plan view of the cutter. Fig. 2 is a transverse section as seen on line 2—2 Fig. 1. Fig. 3 is a detail perspective of one of the adjustable colters. Fig. 4 is a central longitudinal section of the cutter, and Fig. 5 is a transverse section as seen on line 5—5 Fig. 1.

Referring to the drawings forming part of this application, 1 indicates a main frame composed of the parallel bars 2 and 3, secured together by means of the cross bars 4, and mounted upon said main frame, is an auxiliary frame composed of the longitudinal bars 5 and 6, and the transverse overlapping bars 7 and 8.

The longitudinal bars 5 and 6 of said auxiliary frame, are pivoted adjacent their forward ends, to the parallel bars of said main frame, and extend somewhat outwardly therefrom, to form a substantially V-shaped design, and the lower faces of said bars 5 and 6 are provided with extremely wide cutting blades 9 and 10, respectively, the rear ends of said cutting blades being curved completely to form hooks 11. The overlapping transverse bars 7 and 8 are provided with ways to compensate for the overlapping thereof, and the thinned portions of each of said bars are provided with a plurality of registering openings 12, into which are adapted to be inserted pins 13, whereby the bars 5 and 6 may be adjusted to various widths so that the corresponding knife blades thereon may be designed to cut accordingly.

Under ordinary circumstances, where the straight blades are used, it is possible for the stalks of cotton to bend over the blade and escape being cut, but to prevent any such performance, I have provided the rear ends of the knife blades with the complete curved hooks, thereby making it positive that as the cutter is drawn through the fields of cotton, no stalks in the path thereof will escape the knife edge.

As the cutter is drawn through the fields for operative purposes, it is possible that the blades will encounter extremely heavy stalks which will be difficult to readily cut, and it is possible under ordinary circumstances, that the cutter will dodge the same by slipping across the ground, but to obviate this difficulty, I have provided knife colters 14, which are pivotally secured at their upper ends to a longitudinal beam 15 mounted on the transverse bars of the frames, and the lower ends of said colters are bent over the parallel bars of the main frame and secured thereto by means of the removable pins 16. It will be seen therefore, that when these colters are positioned effectively, the cutter is not liable to dodge or slip, and when it is desired to draw the machine from one field to another, said cutters may be drawn out of effective position by removing the pin 16, and moving the same upwardly. Further, to aid the drawing of the device from one field to another when the colters have been thrown out of effective position, the parallel bars of the main frame have their under faces provided with steel runners 17, whereby it will be seen that the device may be drawn easily without wearing the bars which are usually made of wood.

Mounted upon the parallel bars 2 and 3, are the uprights 18 and 19, to which is secured a beam 20, with a seat 21, and mounted upon the forward end of the longitudinal bars 5 and 6, is a plate 22, the forward ends of which are bent upwardly in engagement with one another, and provided with a plurality of openings 23, whereby means may be provided for the attachment of a swingletree and the device may be drawn by horse. I have also provided means for the manual propulsion of the machine, by providing a pair of handles 24, which have their lower ends secured to one of the cross bars 4, and braced upon the seat 21, so that it will be seen that this device may be drawn either by horse or by hand.

In carrying out this invention, it will be seen that I have provided extremely wide knife blades, the rear ends of which are provided with complete curves, whereby none of the stalks in the path of said blades, will be missed.

It will further be seen that I have provided means for the adjustment of the frame carrying the cutting blades, whereby the spacing between the rows may be gaged.

It will further be seen that I have provided colters which may be drawn out of effective position when so desired, and it will still further be seen that when the colters have been thrown out of effective position, whereby the machine may be drawn from place to place, I have provided steel runners on the main frame, the purpose of which is obvious.

What I claim is:

A stalk cutter comprising a main frame, an auxiliary frame having the forward end thereof mounted on the forward end of said main frame, knife blades carried by said auxiliary frame, a longitudinal beam mounted above said auxiliary frame and centrally of said main frame, colters having their upper ends pivotally connected to said longitudinal beam and extended downwardly over the sides of said main frame and into the ground, and means to removably secure said colters to said main frame.

In testimony whereof I have signed my name to this specification in the presence of two subscribing witnesses.

DAUCY McDOWELL.

Witnesses:
J. W. D. Moss,
J. H. Hart.

Copies of this patent may be obtained for five cents each, by addressing the "Commissioner of Patents, Washington, D. C."